Jan. 30, 1968    N. RICKLESS    3,366,436
ULTRAWIDE ANGLE AND HIGH RESOLUTION PROJECTION OBJECTIVE
Filed Aug. 17, 1964
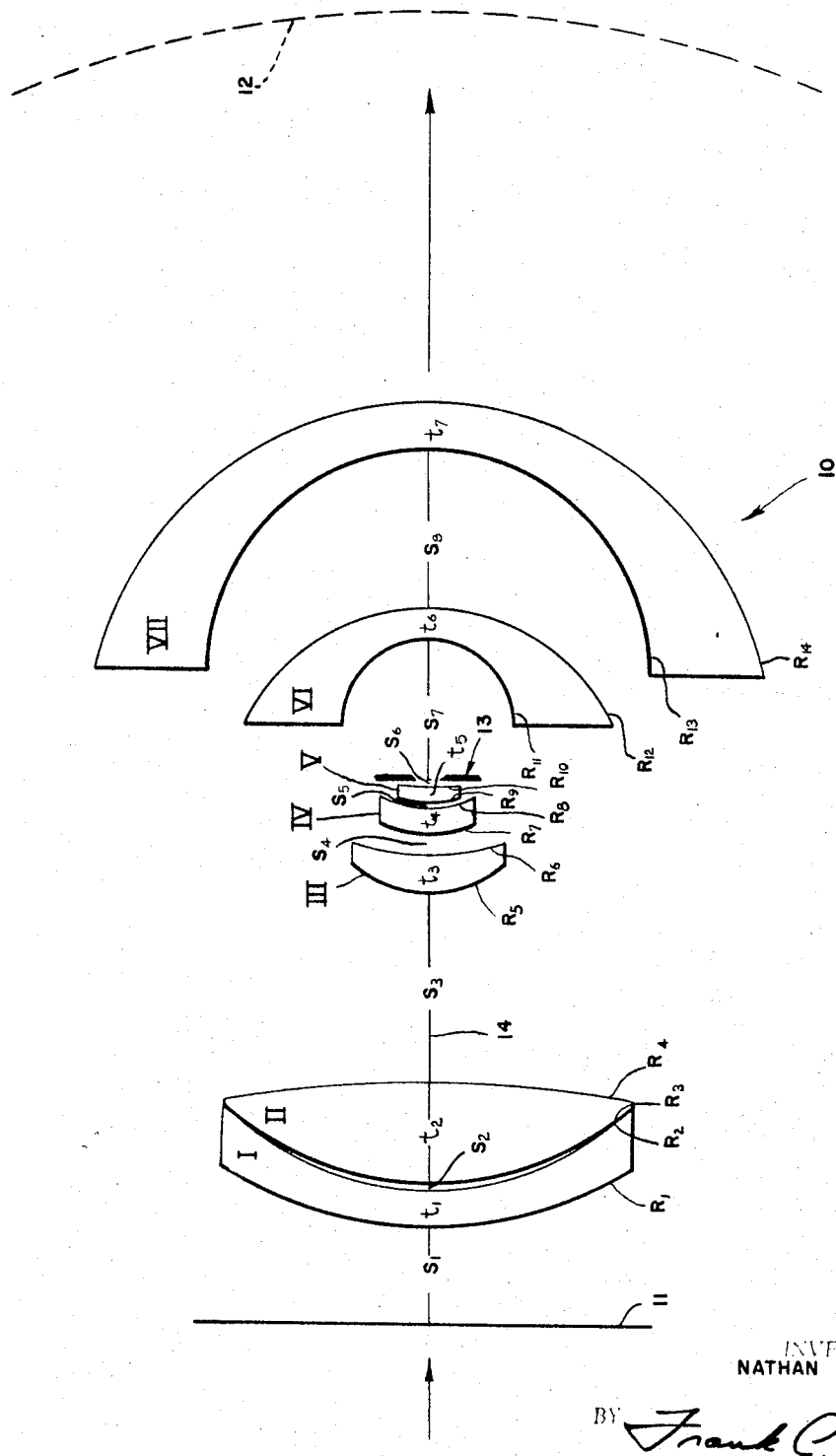
INVENTOR
NATHAN RICKLESS
BY Frank C. Parker
ATTORNEY

United States Patent Office 3,366,436
Patented Jan. 30, 1968

3,366,436
ULTRAWIDE ANGLE AND HIGH RESOLUTION PROJECTION OBJECTIVE
Nathan Rickless, Brighton, N.Y., assignor to Bausch & Lomb Incorporated, Rochester, N.Y., a corporation of New York
Filed Aug. 17, 1964, Ser. No. 390,005
4 Claims. (Cl. 350—176)

ABSTRACT OF THE DISCLOSURE

An ultrawide angle projection objective of at least 153° image field angle for imaging a flat object surface onto an image surface of predetermined curvature, said image having relatively superior correction for spherical and chromatic aberration, coma, distortion and astigmatism, said lens structure being characterized by a positive lens group positioned between the object surface and an intermediate diaphragm and by a deeply curved negative lens group located between said diaphragm and the image plane, the negative lens group being so constructed as to allow ventilation when the objective is used with high intensity lamps.

---

The present invention relates to a projection objective of the ultrawide angle type and more particularly it relates to improvements in such objectives which project an image of a flat object onto a sphericaly curved screen.

In designing an ultrawide-field projection objective which forms a curved image of matching quality onto a curved screen, the problem is generally centered around efforts to match the curvature of the field at every angular position thereof to a specific curvature of screen. Although this problem in itself is relatively complex and formidable, other problems confront a lens designer of projection lenses when high intensity lamps such as the mercury zenon lamp is used in projectors of modern design. Such a high temperature lamp may actually soften glass lenses located near the diaphragm position and therefore care must be used in the lens design to provide proper lens materials as well as sufficient ventilation spaces for cooling air.

Considering the above mentioned difficulties, it is an object of the present invention to provide a novel ultrawide-angle projection objective having excellent correction of the usual image aberrations such as spherical and chromatic aberrations, coma, distortion and astigmatic conditions.

It is a further object to provide such a device which forms a spherically curved image of a flat object surface, the image shape being designed to match a specified curvature of screen on which the image is projected.

It is a further object to provide such a device which is especially adapted for use in projectors having very high temperature lamps, the advantageous structures being found in the lens materials and provisions for ventilation of the hottest parts of the objective.

Further objects and advantages will be apparent from a study of the following specification taken together with the accompanying drawing wherein the single figure is an optical diagram representing a preferred form of the present invention.

The projection objective as illustrated in the drawing is preferably positioned horizontally and is generally designated by the numeral 10. In the present invention an objective lens has been produced which projects an image of a flat film or diapositive 11 onto a sphericaly curved screen 12 having a prescribed curvature, the field formed by said lens having a shape which closely conforms to the screen 12.

According to the present invention, said objective 10 includes a positive group of lenses on the short or front conjugate side which are separated by a diaphragm 13 from a negative group of lenses which lie on the long conjugate side, the lenses in each group being so constructed and arranged with respect to each other that all of the usual chromatic as well as monochromatic aberrations are corrected in an excellent manner as mentioned heretofore. Said front conjugate has a numerical value which is substantially 56% of the equivalent focal length of the objective.

The front lens group on the object or short conjugate side of objective 10 comprises a positive doublet lens member which is composed of a front negative meniscus lens designated I lying in edge contact with a double convex positive lens designated II, the adjacent lens surfaces being such as to allow an axial airspace therebetween. Lens I is spaced at an axial distance which is represented by $S_1$ rearwardly of the object plane 11 and at an axial distance represented by $S_2$ from lens II.

Spaced rearwardly at a distance $S_3$ from lens II is a series of three meniscus lenses which are concave toward the diaphragm 13, the first of which is positive in power and is designated III. Following lens III with an intervening airspace $S_4$ therebetween is the second lens of the group, and it is designated IV and is negative in focal length.

As aforesaid, the objective 10 is designed as a part of a projector using a high intensity light source such as a mercury-zenon lamp which results in highly localized intense heat zone adjacent to the diaphragm 13. In fact the heat is of such a high order as to soften the known glasses which are available for lens manufacture. Because of this fact the third lens in said series, designated V, is made of fused quartz, lens V being spaced at an axial distance $S_5$ from lens IV and the diaphragm 13 being spaced rearwardly at a distance $S_6$ from lens V.

With regard to the rearward group of negative lens members which are designated successively VI and VII, both of these members are negative meniscus in form. Since both lens members are formed of the usual optical glass, lens VI must be spaced at a safe distance designated $S_7$ rearwardly of the vertex of lens V, the extra large distance serving to facilitate forced ventilation in that zone.

Spaced rearwardly of lens VI at an axial distance designated $S_8$ is the lens VII, the dispersive lenses VI and VII together providing a field angle of at least 153° for a spherically curved field 12 or image having excellent resolution. The lenses I to VII are optically aligned on an axis 14 and distortion of opposing corrective sign and value is purposely incorporated in the lens members to properly balance distortion in the final image.

The construction data for the objective 10 is given in the table of mathematical statements herebelow, the values thereof being given for the focal lengths $-F_I$, $F_{II}$, $F_{III}$, $-F_{IV}$, $F_V$, $-F_{VI}$, and $-F_{VII}$ relating respectively to the lenses I to VII, and the minus (—) sign used therewith denotes negative focal lengths; the value also being given for the radii which are designated $R_1$, $R_2$, $R_3$, $-R_4$, $R_5$, $R_6$, $R_7$, $R_8$, $R_9$, $R_{10}$, $-R_{11}$, $-R_{12}$, $-R_{13}$, $-R_{14}$ of the successive lens surfaces, the minus (—) sign meaning that the surface is concave toward entrant light, the lens thicknesses of the successive lenses I to VII being designated $t_1$ to $t_7$, and the successive axial airspaces $S_1$ to $S_8$ being as specified heretofore, and F designating the equivalent focal length of the objective 10.

$9.57F < -F_I < 11.69F$
$2.65F < F_{II} < 3.23F$
$2.73F < F_{III} < 3.33F$
$23.49F < -F_{IV} < 28.71F$
$1.26F < F_V < 1.54F$
$1.452F < -F_{VI} < 1.774F$
$7.17F < -F_{VII} < 8.75F$
$1.912F < R_1 < 2.336F$
$1.478F < R_2 < 1.806F$
$1.537F < R_3 < 1.879F$
$10.420F < R_{-4} < 12.720F$
$.589F < R_5 < .719F$
$.867F < R_6 < 1.059F$
$.566F < R_7 < .692F$
$.508F < R_8 < .620F$
$.439F < R_9 < .535F$
$1.680F < R_{10} < 2.052F$
$.407F < -R_{11} < .497F$ $1.005F < -R_{12} < 1.229F$
$1.100F < -R_{13} < 1.344F$
$1.683F < -R_{14} < 2.057F$
$.50300F < S_1 < .61500F$
$.02141F < S_2 < .02615F$
$.92000F < S_3 < 1.12000F$
$.08610F < S_4 < .10510F$
$.00465F < S_5 < .00569F$
$.01920F < S_6 < .02340F$
$.70100F < S_7 < .85600F$
$.76700F < S_8 < .93700F$
$.15370F < t_1 < .18790F$
$.53700F < t_2 < .65500F$
$.19210F < t_3 < .23470F$
$.10330F < t_4 < .12630F$
$.09570F < t_5 < .11690F$
$.15370F < t_6 < .18790F$
$.23920F < t_7 < .29240F$

Absolute values:
$n_D(I) = 1.805$
$n_D(II) = 1.517$
$n_D(III) = 1.517$
$n_D(IV) = 1.621$
$n_D(V) = 1.458$
$n_D(VI) = 1.517$
$n_D(VII) = 1.517$ Absolute values:
$\gamma(I) = 25.4$
$\gamma(II) = 64.5$
$\gamma(III) = 64.5$
$\gamma(IV) = 36.2$
$\gamma(V) = 67.6$
$\gamma(VI) = 64.5$
$\gamma(VII) = 64.5$ In objective 10, the diameter of the aperture in the diaphragm 13 is substantially .092F.

In the chart below the numerical values for all of the constructional data related to one preferred form of the objective 10 are given, the symbolism having the same meaning as heretofore, the scalar dimensions being given in millimeters, and E.F.L. and F.F.L. meaning respectively equivalent focal length and front conjugate of the objective, considering the objective as a projection lens.

E.F.L.=44.505    F.F.L.=24.868    Proj. Angle=153°

| Lens | Focal Length | Radii | Thickness | Spaces | $n_D$ | $\nu$ |
|---|---|---|---|---|---|---|
| I | $-F_I = 474.34$ | $R_1 = 94.624$ $R_2 = 73.114$ | $t_1 = 7.60$ | $S_1 = 24.868$ $S_2 = 1.060$ | 1.805 | 25.4 |
| II | $F_{II} = 129.882$ | $R_3 = 75.858$ $-R_4 = 515.230$ | $t_2 = 26.50$ | $S_3 = 45.400$ | 1.517 | 64.5 |
| III | $F_{III} = 135.130$ | $R_5 = 29.107$ $R_6 = 42.855$ | $t_3 = 9.50$ | $S_4 = 4.250$ | 1.517 | 64.5 |
| IV | $-F_{IV} = 1161.0$ | $R_7 = 23.054$ $R_8 = 25.119$ | $t_4 = 5.11$ | $S_5 = 0.230$ | 1.621 | 36.2 |
| V | $F_V = 62.438$ | $R_9 = 21.677$ $R_{10} = 83.176$ | $t_5 = 4.73$ | $S_6 = 0.050$ $S_7 = 34.550$ | 1.4584 | 67.6 |
| VI | $-F_{VI} = 71.817$ | $-R_{11} = 20.137$ $-R_{12} = 49.659$ | $t_6 = 7.50$ | $S_8 = 37.550$ | 1.517 | 64.5 |
| VII | $-F_{VII} = 354.75$ | $-R_{13} = 54.450$ $-R_{14} = 83.176$ | $t_7 = 11.83$ | | 1.517 | 64.5 |

The refractive index $n_D$ and Abbe number $\gamma$ relating to the successive lenses I to VII have absolute values as given in the table of mathematical statements herebelow, Absolute values:
$1.800 < n_D(I) < 1.810$
$1.510 < n_D(II) < 1.530$
$1.510 < n_D(III) < 1.530$
$1.615 < n_D(IV) < 1.630$
$1.456 < n_D(V) < 1.460$
$1.510 < n_D(VI) < 1.530$
$1.510 < n_D(VII) < 1.530$ Absolute values:
$20.0 < \gamma(I) < 30.0$
$60.0 < \gamma(II) < 70.0$
$60.0 < \gamma(III) < 70.0$
$31.0 < \gamma(IV) < 41.0$
$62.0 < \gamma(V) < 72.0$
$60.0 < \gamma(VI) < 70.0$
$60.0 < \gamma(VII) < 70.0$ More specifically the constructional data for one successful form of the present invention is given in the consolidated table of mathematical statements herebelow wherein the symbolism has the same meaning as explained heretofore.

$R_1 = 2.124F$
$R_2 = 1.642F$
$R_3 = 1.708F$
$-R_4 = 11.570F$
$R_5 = .654F$
$R_6 = .963F$
$R_7 = .629F$
$R_8 = .564F$
$R_9 = .487F$
$R_{10} = 1.866F$
$-R_{11} = .452F$
$-R_{12} = 1.117F$
$-R_{13} = 1.222F$
$-R_{14} = 1.870F$
$S_1 = .5590F$ $S_2 = .02378F$
$S_3 = 1.0200F$
$S_4 = .0956F$
$S_5 = .00517F$
$S_6 = .0213F$
$S_7 = .7780F$
$S_8 = .8520F$
$t_1 = .1708F$
$t_2 = .5960F$
$t_3 = .2134F$
$t_4 = .1148F$
$t_5 = .1063F$
$t_6 = .1708F$
$t_7 = .2658F$

Although only a single specific example of the present invention has been shown and described in detail, other forms are possible and changes and substitutions may be made in specific values within the stated ranges without departing from the spirit of the invention as defined in the following claims.

I claim:

1. An ultra wide angle projection objective which forms a high resolution curved image of a flat object surface, the projection angle for the objective being at least 150°, the front conjugate being substantially 56% of the equivalent focal length of the objective, said objective comprising a front collective lens group which is airspaced from a rear dispersive less group and includes a diaphragm therebetween, said front collective group comprising a foremost negative meniscus lens designated I which is spaced at an axial distance $S_1$ away from said object surface, said lens being concave toward said diaphragm, a double convex lens lying in edge contact with lens I and having a meniscus shaped airspace $S_2$ therebetween, said convex lens being designated II, a series of three convex-concave lenses which are concave toward said diaphragm and are respectively designated III, IV and V, said lenses being spaced from lens II and from each other by axial spaces which are successively designated $S_3$, $S_4$ and $S_5$, the space between vertex of lens V and said diaphragm being designated $S_6$, said rear dispersive lens group comprising a pair of negative meniscus lenses which are designated VI and VII in order from the diaphragm, the successive interlens axial airspaces from lens V to lens VI and from lens VI to lens VII being designated $S_7$ and $S_8$ respectively, the individual focal lengths of lenses I to VII being designated successively $-F_I$, $F_{II}$, $F_{III}$, $-F_{IV}$, $F_V$, $-F_{VI}$, $-F_{VII}$, wherein the minus (−) sign designates negative focal lengths, the specific values for said focal lengths, airspaces, and lens thicknesses in terms of F which represents the equivalent focal length of siad objective being substantially as specified in the table given herebelow.

| | |
|---|---|
| $-F_I=10.63F$ | $S_5=.00517F$ |
| $F_{II}=2.94F$ | $S_6=.0213F$ |
| $F_{III}=3.03F$ | $S_7=.778F$ |
| $-F_{IV}=26.10F$ | $S_8=.852F$ |
| $F_V=1.40F$ | $t_1=.1708F$ |
| $-F_{VI}=1.61F$ | $t_2=.5960F$ |
| $-F_{VII}=7.96F$ | $t_3=.2134F$ |
| $S_1=.5590F$ | $t_4=.1148F$ |
| $S_2=.02378F$ | $t_5=.1063F$ |
| $S_3=1.020F$ | $t_6=.1708F$ |
| $S_4=.0956F$ | $t_7=.2658F$ |

2. An ultrawide angle projection objectie which forms a high resolution curved image o fa flat object surface, the projection angle for the objective being at least 150°, the front conjugate being substantially 56% of the equivalent focal length of the objective, said objective comprising a front collective lens group which is airspaced from a rear dispersive lens group and includes a diaphragm therebetween, said front collective group comprising a foremost negative meniscus lens designated I which is spaced at an axial distance $S_1$ away from said object surface, said lens being concave toward said diaphragm, a double convex lens lying in edge contact with lens I and having a meniscus shaped airspace $S_2$ therebetween, said convex lens being designated II, a series of three convex-concavo lenses which are concave toward said diaphragm and are respectively designated III, IV and V, said lenses being spaced from lens II and from each other by axial spaces which are successively designated $S_3$, $S_4$ and $S_5$, the space between vertex of lens V and said diaphragm being designated $S_6$.

said rear dispersive lens group comprising a pair of negative meniscus lenses which are designated VI and VII in order from the diaphragm, the successive interlens axial airspaces from lens V to lens VI and from lens VI to lens VII being designated $S_7$ and $S_8$ respectively, the individual radii of the successive lens surfaces of lenses I to VII being designated respectively $R_1$ to $R_{14}$ and having values as given in the table of mathematical statements herebelow, the minus (−) sign used therewith denoting a lens surface which is concave toward entrant light, the successive airspaces $S_1$ to $S_8$, and successive lens thicknesses $t_1$ to $t_7$ of said lenses having values as given in said table, the specific values being given substantially in terms of F which represents the equivalent focal length of said objective,

| | |
|---|---|
| $R_1=2.124F$ | $S_1=.5590F$ |
| $R_2=1.642F$ | $S_2=.02378F$ |
| $R_3=1.708F$ | $S_3=1.020F$ |
| $-R_4=11.570F$ | $S_4=.0956F$ |
| $R_5=.654F$ | $S_5=.00517F$ |
| $R_6=.963F$ | $S_6=.0213F$ |
| $R_7=.629F$ | $S_7=.7780F$ |
| $R_8=.564F$ | $S_8=.8520F$ |
| $R_9=.487F$ | $t_1=.1708F$ |
| $R_{10}=1.866F$ | $t_2=.5960F$ |
| $-R_{11}=.452F$ | $t_3=.2134F$ |
| $-R_{12}=1.117F$ | $t_4=.1148F$ |
| $-R_{13}=1.222F$ | $t_5=.1063F$ |
| $-R_{14}=1.870F$ | $t_6=.1708F$ |
| | $t_7=.2658F$ |

3. An ultra wide angle projection objective which forms a high resulution curved image of a flat object surface, the projection angle for the objective being at least 150°, the front conjugate being substantially 56% of the equivalent focal length of the objective, said objective comprising a front collective lens group which is airspaced from a rear dispersive lens group and includes a diaphragm therebetween, said front collective group comprising a foremost negative meniscus lens designated I which is spaced at an axial distance $S_1$ away from said object surface, said lens being concave toward said diaphragm, a double convex lens lying in edge contact with lens I and having a meniscus shaped airspace $S_2$ therebetween, said convex lens being designated II, a series of three convex-concavo lenses which are concave toward said diaphragm and are respectively designated III, IV and V, said lenses being spaced from lens II and from each other by axial spaces which are successively designated $S_3$, $S_4$ and $S_5$, the space between vertex of lens V and said diaphragm being designated $S_6$, said rear dispersive lens group comprising a pair of negative meniscus lenses which are designated VI and VII in order from the diaphragm, the successive interlens axial airspaces from lens V to lens VI and from lens VI to lens VII being designated $S_7$ and $S_8$ respectively, the individual radii of the successive lens surfaces of lenses I to VII being designated respectively $R_1$ to $R_{14}$ and having values as given in the table of mathematical statements herebelow, the minus (−) sign used therewith denoting a lens surface which is concave toward entrant light, the successive airspaces $S_1$ to $S_8$, and successive lens thicknesses $t_1$ to $t_7$ of said lenses having values as given in said table, the specific values being given substantially in terms of F which represents the equivalent focal length of said objective,

| | |
|---|---|
| $R_1=2.124F$ | $S_1=.5590F$ |
| $R_2=1.642F$ | $S_2=.02378F$ |
| $R_3=1.708F$ | $S_3=1.020F$ |
| $-R_4=11.570F$ | $S_4=.0956F$ |
| $R_5=.654F$ | $S_5=.00517F$ |
| $R_6=.963F$ | $S_6=.0213F$ |
| $R_7=.629F$ | $S_7=.7780F$ |
| $R_8=.564F$ | $S_8=.8520F$ |
| $R_9=.487F$ | $t_1=.1708F$ |
| $R_{10}=1.866F$ | $t_2=.5960F$ |
| $-R_{11}=.452F$ | $t_3=.2134F$ |
| $-R_{12}=1.117F$ | $t_4=.1148F$ |
| $-R_{13}=1.222F$ | $t_5=.1063F$ |
| $-R_{14}=1.870F$ | $t_6=.1708F$ |
| | $t_7=.2658F$ | the refractive index $n_D$ and the Abbe number $\nu$ of the glasses in said lenses I to VII having values substantially as given in the table herebelow,

| Absolute values: | Absolute values: |
|---|---|
| $n_D(I)=1.805$ | $\nu(I)=25.4$ |
| $n_D(II)=1.517$ | $\nu(II)=64.5$ |
| $n_D(III)=1.517$ | $\nu(III)=64.5$ |
| $n_D(IV)=1.621$ | $\nu(IV)=36.2$ |
| $n_D(V)=1.458$ | $\nu(V)=67.6$ |
| $n_D(VI)=1.517$ | $\nu(VI)=64.5$ |
| $n_D(VII)=1.517$ | $\nu(VII)=64.5$ | the diameter of the aperture in said diaphragm being .092F.

4. An ultra wide angle projection objective which forms a high projection angle for the objective being at surface, the projection angle for the objective being at least 150°,
   the front conjugate being substantially 56% of the equivalent focal length of the objective,
   said objective comprising a front collective lens group which is airspaced from a rear dispersive lens group and includes a diaphragm therebetween,
   said front collective group comprising a foremost negative meniscus lens designated I which is spaced at an axial distance $S_1$ away from said object surface, said lens being concave toward said diaphragm,
   a double convex lens lying in edge contact with lens I and having a meniscus shaped airspace $S_2$ therebetween, said convex lens being designated II,
   a series of three convex-concavo lenses which are concave toward said diaphragm and are respectively designated III, IV and V, said lenses being spaced from lens II and from each other by axial spaces which are successively designated $S_3$, $S_4$ and $S_5$, the space between vertex of lens V and said diaphragm being designated $S_6$,
   said rear dispersive lens group comprising a pair of negative meniscus lenses which are designated VI and VII in order from the diaphragm, the successive interlens axial airspaces from lens V to lens VI and from lens VI to lens VII being designated $S_7$ and $S_8$ respectively,
   the individual focal lengths of lenses I to VII being designated successively $-F_I$, $F_{II}$, $F_{III}$, $-F_{IV}$, $F_V$, $-F_{VI}$, $-F_{VII}$, wherein the minus (—) sign designates negative focal lengths,
   the successive lens radii numbering from the object side being designated $R_1$ to $R_{14}$ and the minus (—) sign used therewith denoting those lens surfaces which are concave toward entrant light, the symbols $n_D$ and $\nu$ designating respectively the refractive index and Abbe number of the optical materials from which the lenses are made,
   the numerical values of the constructional data for one form of said objective being given in millimeters in the chart herebelow, E.F.L.=44.505     F.F.L.=24.868     Proj. Angle=153°

| Lens | Focal Length | Radii | Thickness | Spaces | $n_D$ | $\nu$ |
|---|---|---|---|---|---|---|
| I | $-F_I = 474.34$ | $R_1 = 94.624$ $R_2 = 73.114$ | $t_1 = 7.60$ | $S_1 = 24.868$ $S_2 = 1.060$ | 1.805 | 25.4 |
| II | $F_{II} = 129.882$ | $R_3 = 75.858$ $-R_4 = 515.230$ | $t_2 = 26.50$ | $S_3 = 45.400$ | 1.517 | 64.5 |
| III | $F_{III} = 135.130$ | $R_5 = 29.107$ $R_6 = 42.855$ | $t_3 = 9.50$ | $S_4 = 4.250$ | 1.517 | 64.5 |
| IV | $-F_{IV} = 1161.0$ | $R_7 = 28.054$ $R_8 = 25.119$ | $t_4 = 5.11$ | $S_5 = 0.0230$ | 1.621 | 36.2 |
| V | $F_V = 62.438$ | $R_9 = 21.677$ $R_{10} = 83.176$ | $t_5 = 4.73$ | $S_6 = 0.950$ $S_7 = 34.550$ | 1.4584 | 67.6 |
| VI | $-F_{VI} = 71.817$ | $-R_{11} = 20.157$ $-R_{12} = 49.656$ | $t_6 = 7.50$ | $S_8 = 37.850$ | 1.517 | 64.5 |
| VII | $-F_{VII} = 354.75$ | $-R_{13} = 54.450$ $-R_{14} = 83.176$ | $t_7 = 11.83$ | | 1.517 | 64.5 | wherein E.F.L. denotes the equivalent focal length, and F.F.L. denotes the front conjugate, considering that entrant light is first directed from the transparent object through lens I.

No references cited.

DAVID H. RUBIN, *Primary Examiner.*

JOHN K. CORBIN, *Examiner.*